(12) United States Patent
Imamura

(10) Patent No.: US 7,773,845 B2
(45) Date of Patent: Aug. 10, 2010

(54) OPTICAL FIBER AND OPTICAL-FIBER TRANSMISSION LINE

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 332 days.

(21) Appl. No.: 12/041,230

(22) Filed: Mar. 3, 2008

(65) Prior Publication Data

US 2008/0310807 A1     Dec. 18, 2008

(30) Foreign Application Priority Data

Mar. 12, 2007   (JP)  .............................. 2007-062100

(51) Int. Cl.
    *G02B 6/028*   (2006.01)
    *G02B 6/036*   (2006.01)
(52) U.S. Cl. ...................................... 385/124; 385/127
(58) Field of Classification Search ................. 385/124, 385/126–127
    See application file for complete search history.

(56) References Cited

U.S. PATENT DOCUMENTS

2006/0039661 A1 * 2/2006 Ruilier et al. ............... 385/123

2008/0310807 A1   12/2008  Imamura

FOREIGN PATENT DOCUMENTS

JP          2004-271904         9/2004

OTHER PUBLICATIONS

Masatoshi Suzuki, et al., "Dispersion-Managed High-Capacity Ultra-Long-Haul Transmission", Journal of Lightwave Technology, vol. 21, No. 4, Apr. 2003, pp. 916-929.
U.S. Appl. No. 12/046,059, filed Mar. 11, 2008, Imamura.
U.S. Appl. No. 12/133,782, filed Jun. 5, 2008, Imamura.
U.S. Appl. No. 12/546,894, filed Aug. 25, 2009, Imamura.

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

An optical fiber transmits at least a signal light having a wavelength of 1550 nanometers in a fundamental propagation mode. The optical fiber has a cutoff wavelength equal to or longer than a wavelength of 1550 nanometers, a wavelength dispersion in the fundamental propagation mode at the wavelength of 1550 nanometers larger than 0 ps/nm/km, and a dispersion slope in the fundamental propagation mode at the wavelength of the signal light equal to or smaller than $-0.05$ ps/nm$^2$/km.

19 Claims, 9 Drawing Sheets

| ITEM | Δ1 | Δ2 | Δ3 | b/a | c/a | 2a |
|---|---|---|---|---|---|---|
| UNIT | % | % | % | - | - | μm |
| VALUE | 0.34 | -0.3 | 0.3 | 2.4 | 3.45 | 10.09 |

| ITEM | WAVELENGTH DISPERSION | SLOPE | DPS | MFD | Aeff | THEORETICAL CUT-OFF WAVELENGTH | | β/k |
|---|---|---|---|---|---|---|---|---|
| | | | | | | LP11 | LP02 | |
| UNIT | ps/nm/km | ps/nm²/km | nm | μm | μm² | nm | nm | - |
| VALUE | 9.1 | -0.172 | -53 | 9.34 | 79.5 | 4047 | 2462 | 1.44650 |

| PROPAGATION MODE | COUPLING EFFICIENCY |
|---|---|
| LP01 | 0.90 |
| LP02 | 0.03 |
| LP11 | 1.7E-34 |
| LP21 | 3.3E-32 |
| LP31 | 2.7E-37 |
| LP41 | 2.5E-11 |

FIG.15

| ITEM | Δ1 | α1 | Δ2 | Δ3 | b/a | c/a | 2a |
|---|---|---|---|---|---|---|---|
| UNIT | % | - | % | % | - | - | μm |
| FIRST EXAMPLE | 0.32 | 10 | -0.12 | 0.2 | 2.6 | 4.7 | 11.43 |
| SECOND EXAMPLE | 0.34 | 5 | -0.63 | 0.24 | 1.9 | 3.2 | 12.07 |
| THIRD EXAMPLE | 0.42 | 2 | -0.32 | 0.28 | 2.15 | 3.15 | 11.78 |
| FOURTH EXAMPLE | 0.62 | 2 | -0.1 | 0.2 | 2.9 | 4.8 | 7.67 |
| FIFTH EXAMPLE | 0.64 | 2 | -0.7 | 0.3 | 2.3 | 3.6 | 8.25 |
| SIXTH EXAMPLE | 0.72 | 4 | -0.4 | 0.25 | 2.8 | 4.4 | 6.12 |

FIG.16

| ITEM | WAVELENGTH DISPERSION | SLOPE | DPS | MFD | Aeff | TRANSMISSION LOSS | BENDING LOSS | λc |
|---|---|---|---|---|---|---|---|---|
| UNIT | ps/nm/km | ps/nm²/km | nm | μm | μm² | dB/km | dB/m | nm |
| FIRST EXAMPLE | 11.5 | -0.288 | -40 | 10.46 | 90.6 | 0.237 | 20 | 6800 |
| SECOND EXAMPLE | 15.4 | -0.200 | -77 | 9.25 | 74.8 | 0.231 | 15 | 4100 |
| THIRD EXAMPLE | 10.4 | -0.201 | -52 | 9.24 | 70.4 | 0.223 | 7 | 3900 |
| FOURTH EXAMPLE | 3.3 | -0.058 | -56 | 7.90 | 47.1 | 0.242 | 12 | 3900 |
| FIFTH EXAMPLE | 7.3 | -0.397 | -18 | 6.71 | 36.3 | 0.234 | 8 | 3000 |
| SIXTH EXAMPLE | 4.9 | -0.055 | -89 | 6.14 | 29.2 | 0.227 | 3 | 2500 |

OPTICAL FIBER AND OPTICAL-FIBER TRANSMISSION LINE

BACKGROUND OF THE INVENTION

1. Field of the Invention

The present invention relates to an optical fiber and an optical-fiber transmission line for a long-haul optical signal transmission.

2. Description of the Related Art

For example, an optical transmission line is used that is formed by combining a large-Aeff-type nonzero dispersion-shifted optical fiber having a large effective core area and a low-slope-type nonzero dispersion-shifted optical fiber having a small dispersion slope, as an optical transmission line for undersea installation (see, e.g., M. Suzuki, et al., "Dispersion-Managed High-Capacity Ultra-Long-Haul Transmission", J. Lightwave Technol., vol. 21, no. 4, pp. 916-929, April 2003). A "nonzero dispersion-shifted optical fiber" is a single-mode optical fiber that has, at a wavelength of a signal light, for example, an extremely small wavelength dispersion of about −1 ps/nm/km to −5 ps/nm/km or about 1 ps/nm/km to 5 ps/nm/km. In an undersea transmission line, nonzero dispersion-shifted optical fibers each having negative dispersion are often used.

Optical characteristics of the large-Aeff-type nonzero dispersion-shifted optical fiber are, for example, 75 $\mu m^2$ as the effective core area and 0.10 $ps/nm^2/km$ as the dispersion slope. Optical characteristics of the low-slope-type nonzero dispersion-shifted optical fiber are, for example, 50 $\mu m^2$ as the effective core area and 0.05 $ps/nm^2/km$ as the dispersion slope. The average optical characteristics of an optical-fiber transmission line formed by connecting the above optical fibers both having the substantially same length are 65 $\mu m^2$ as the effective core area and 0.07 $ps/nm^2/km$ as the dispersion slope.

Usually, in the nonzero dispersion-shifted optical-fiber transmission line, an optical signal is transmitted from the large-Aeff-type nonzero dispersion-shifted optical fiber side. As a result, in a state where the optical intensity of the optical signal is high, occurrence of non-linear optical phenomena is suppressed because the effective core area of the optical transmission line is large. Thereafter, the optical signal is input into the low-slope-type nonzero dispersion-shifted optical fiber after the optical intensity is attenuated due to the transmission loss of the optical fiber. The low-slope-type nonzero dispersion-shifted optical fiber has a relatively small effective core area. However, the fiber has a small dispersion slope and the difference between the wavelength dispersions for different wavelengths is small. As a result, for transmission of a wide-band WDM signal light formed by wavelength-division-multiplexed signal lights respectively having different wavelengths, generation of any deviation of wavelength dispersion between the optical signals is suppressed.

That is, in the nonzero dispersion-shifted optical fiber, the effective core area and the dispersion slope are in a tradeoff relationship. Therefore, moderation of the tradeoff relationship is facilitated for the entire optical-fiber transmission line by configuring the optical transmission line by combining the large-Aeff-type nonzero dispersion-shifted optical fiber and the low-slope-type nonzero dispersion-shifted optical fiber.

A technique using a multimode optical fiber is disclosed as a technique of significantly expanding the effective core area by moderating the above tradeoff relationship (see, e.g., Japanese Patent Application Laid-open No. 2004-271904).

Because all of the above nonzero dispersion-shifted optical fibers each have a negative wavelength dispersion at the wavelength of the signal light, a negative accumulated wavelength dispersion is generated for the entire optical-fiber transmission line. Therefore, the dispersion needs to be compensated using a dispersion compensating optical fiber that has a positive wavelength dispersion at the wavelength of the signal light. Conventionally, this type of dispersion compensating fiber has the same configuration as that of a standard single-mode optical fiber having the zero-dispersion wavelength of about 1310 nanometers, and uses a cutoff shift optical fiber of which the bending resistance in the fundamental propagation mode thereof is enhanced by shifting the cutoff wavelength thereof to 1550 nanometers.

However, all of the large-Aeff-type and the low-slope-type nonzero dispersion-shifted optical fibers and a cutoff shift optical fiber each have a positive dispersion slope. Therefore, even when wavelength dispersion of an optical-fiber transmission line at the wavelength of 1550 nanometers is compensated using, for example, a cutoff shift optical fiber, compensation of the dispersion slope can not be executed. As a result, at wavelengths other than 1550 nanometers for which the dispersion is compensated, accumulated wavelength dispersion remains, and the remaining accumulated wavelength dispersion becomes larger as the wavelength becomes away from 1550 nanometers. Therefore, a problem has arisen that a broadband WDM transmission is not enabled.

SUMMARY OF THE INVENTION

It is an object of the present invention to at least partially solve the problems in the conventional technology.

According to an aspect of the present invention, there is provided an optical fiber that transmits at least a signal light having a wavelength of 1550 nanometers in a fundamental propagation mode. The optical fiber has a cutoff wavelength equal to or longer than a wavelength of 1550 nanometers, a wavelength dispersion in the fundamental propagation mode at the wavelength of 1550 nanometers larger than 0 ps/nm/km, and a dispersion slope in the fundamental propagation mode at the wavelength of 1550 nanometers equal to or smaller than −0.05 $ps/nm^2/km$.

Furthermore, according to another aspect of the present invention, there is provided an optical-fiber transmission line including an optical fiber that transmits at least a signal light having a wavelength of 1550 nanometers in a fundamental propagation mode and that has a cutoff wavelength equal to or longer than a wavelength of 1550 nanometers, a wavelength dispersion larger than 0 ps/nm/km in the fundamental propagation mode at the wavelength of 1550 nanometers, and a dispersion slope in the fundamental propagation mode at the wavelength of 1550 nanometers equal to or smaller than −0.05 $ps/nm^2/km$; and a single-mode optical fiber that is configured to be connected to the optical fiber and that has a cutoff wavelength shorter than the wavelength of 1550 nanometers, a wavelength dispersion smaller than 0 ps/nm/km at the wavelength of 1550 nanometers, and a dispersion slope larger than 0 $ps/nm^2/km$ at the wavelength of 1550 nanometers. The signal light is transmitted from the single-mode optical fiber.

The above and other objects, features, advantages and technical and industrial significance of this invention will be better understood by reading the following detailed descrip-

BRIEF DESCRIPTION OF THE DRAWINGS

FIG. 15 is a table of design parameters of optical fibers according to a first to a sixth examples of the present invention;

FIG. 16 is a table of optical characteristics of the optical fibers according to the first to the sixth examples;

DETAILED DESCRIPTION OF THE PREFERRED EMBODIMENTS

Exemplary embodiments of an optical fiber and an optical-fiber transmission line according to the present invention are explained in detail below with reference to the accompanying drawings. However, the present invention is not limited by these embodiments. A "Bending loss" in the specification means a bending loss generated when an optical fiber is wound for 16 turns at a diameter of 20 millimeters. When simply referred to as a "cutoff wavelength", this term means a fiber cutoff wavelength λc defined by ITU-T (International Telecommunication Union Telecommunication Standardization Sector) G.650.1. In addition, terms that are not specifically defined herein follow the definition and the measuring methods in ITU-T G.650.1.

An optical fiber according to a first embodiment is an optical fiber that transmits, in a fundamental propagation mode, a WDM signal light in a wavelength band of 1530 nanometers to 1565 nanometers, which is called a "C-band", and that has a cutoff wavelength of 1550 nanometers or larger, a wavelength dispersion of the fundamental propagation mode at the wavelength of 1550 nanometers of 0 ps/nm/km or larger, and a dispersion slope of −0.05 ps/nm$^2$/km or smaller.

That is, the optical fiber according to the first embodiment is a multimode optical fiber for which a plurality of propagation mode at the wavelength of a signal light that is shorter than the cutoff wavelength are present such as an LP02 mode, an LP11 mode, an LP21 mode, an LP31 mode, and an LP41 mode that are high order modes in addition to an LP01 mode that is the fundamental propagation mode. That is, optical characteristics of the optical fiber that are the wavelength dispersion in the fundamental propagation mode at the wavelength of 1550 nanometers of 0 ps/nm/km or larger and the dispersion slope of −0.05 ps/nm$^2$/km or smaller are realized because there is no limitation in designing such as that the cutoff wavelength must be made shorter than the shortest signal light wavelength to manufacture the optical fiber as a single-mode optical fiber for which only the fundamental propagation mode is present as the propagation mode.

Furthermore, the optical fiber according to the first embodiment realizes the above wavelength dispersion and dispersion slope, and has the bending loss of 20 dB/m or smaller that is sufficiently low.

To transmit each signal light in the fundamental propagation mode using the optical fiber according to the first embodiment, for example, a single-mode optical fiber having the cutoff wavelength that is shorter than the wavelength of each signal light is connected to the optical fiber and a signal light is input into the optical fiber according to the first embodiment through this single-mode optical fiber. As a result, only the fundamental propagation mode is selectively excited and the optical fiber according to the first embodiment transmits each signal light in the fundamental propagation mode.

Figure 1:
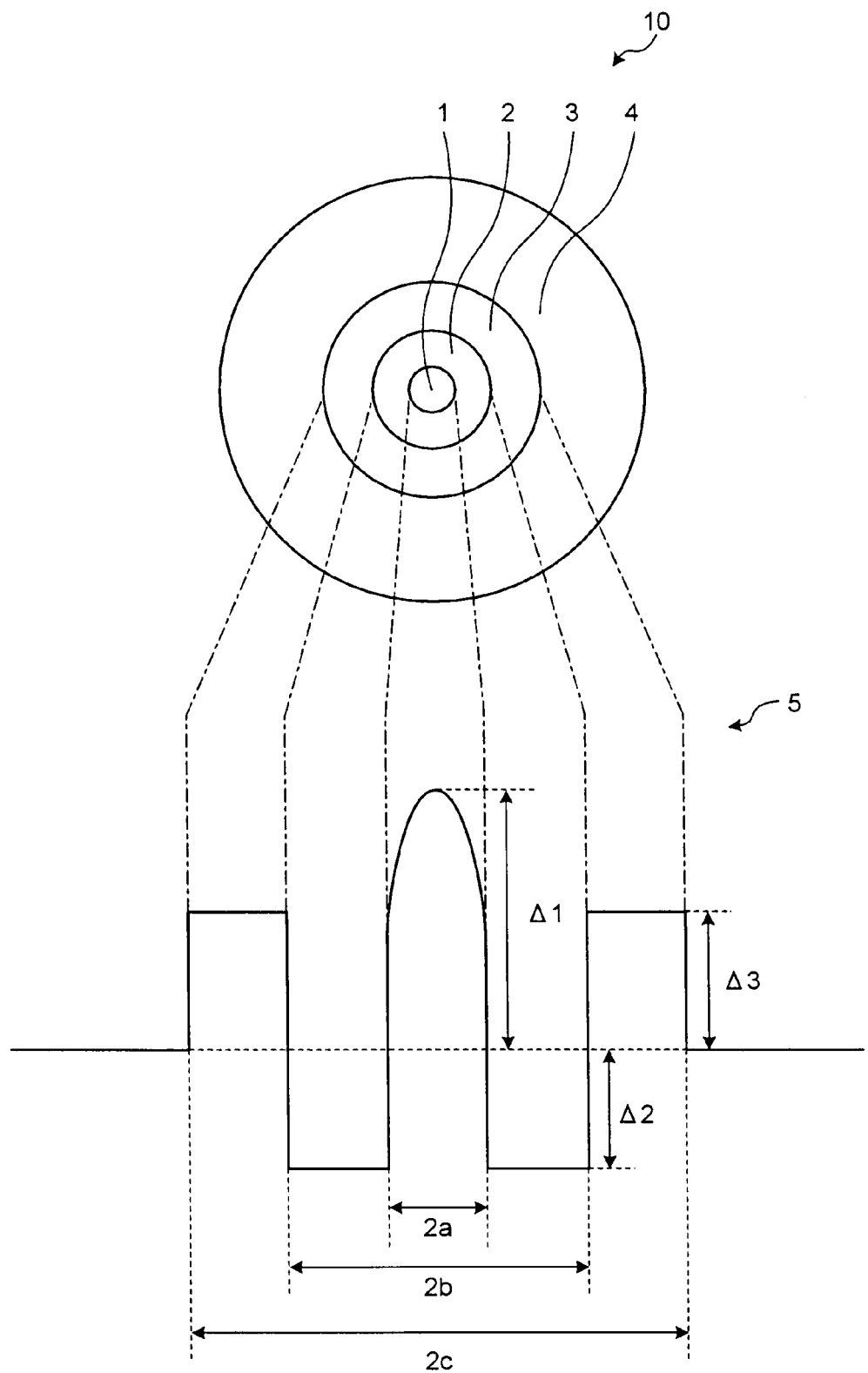
FIG. 1 is a schematic diagram of a cross-section and a refractive index profile of an optical fiber according to a first embodiment of the present invention.

Description will be given in detail for the structure and the design parameters of the optical fiber according to the first embodiment. FIG. 1 is a schematic diagram of a cross-section and a refractive index profile of an optical fiber 10 according to the first embodiment. As shown in FIG. 1, the optical fiber 10 includes a center core region 1, an inner core layer 2 that is formed on the circumference of the center core region 1 and that has a refractive index lower than that of the center core region 1, an outer core layer 3 that is formed on the circumference of the inner core layer 2 and that has a refractive index lower than that of the center core region 1 and higher than that of the inner core layer 2, and a cladding layer 4 that is formed on the circumference of the outer core layer 3 and that has a refractive index higher than that of the inner core layer 2 and lower than that of the outer core layer 3. That is, the optical fiber 10 has a so-called W-segment-type refractive index profile 5. The center core region 1 has an α-type refractive index profile. The inner core layer 2 and the outer core layer 3 each have a step-type refractive index profile.

Denoting an α value as α1 that is a parameter that defines the α-type refractive index profile, α1 is defined by Equation (1).

$$n^2(r) = n_{core}^2 \times \{1 - 2\times(\Delta/100)\times(r/a)^{\alpha 1}\} \text{ (where } 0<r<a\text{)} \quad (1)$$

In the above equation r represents a position in the radial direction from the center of the center core region, n(r) represents the refractive index at the position r, $n_{core}$ represents the refractive index at r=0 in the center core region, and "a" represents the radius of the center core region. The symbol "^" is a symbol that represents an exponential.

As to design parameters of the optical fiber 10, in the refractive index profile 5, the relative refractive index difference Δ1 of the center core region 1 to the cladding layer 4% is 0.75% or smaller, the relative refractive index difference Δ2 of the inner core layer 2 to the cladding layer 4 is −0.7% to 0%, the relative refractive index difference Δ3 of the outer core layer 3 to the cladding layer 4 is 0.2% to 0.3%, a ratio b/a of the outer diameter 2b of the inner core layer 2 to the diameter 2a of the center core region 1 is 1.5 or larger, a ratio c/a of the outer diameter 2c of the outer core layer 3 to the diameter 2a of the center core region 1 is 2.8 or larger, and the diameter 2a of the center core region 1 is 6.4 micrometers or larger.

When the optical fiber 10 has the above structure and design parameters, the optical fiber 10 has the cutoff wavelength of 1550 nanometers or longer, the wavelength dispersion in the fundamental propagation mode at the wavelength of 1550 nanometers of 0 ps/nm/km or larger, the dispersion slope of −0.05 ps/nm²/km or smaller, the effective core area of 40 μm² or larger, the bending loss of 20 dB/m or smaller, the DPS (dispersion per slope) that is a value obtained by dividing the wavelength dispersion by the dispersion slope of a negative value of −100 nanometers or larger.

The DPS of an undersea-use optical-fiber transmission line formed by combining the above large-Aeff-type nonzero dispersion-shifted optical fiber and the above low-slope-type nonzero dispersion-shifted optical fiber is usually −50 nanometers to −20 nanometers. Therefore, when the DPS of the optical fiber 10 is a negative value of −100 nanometers or larger, the optical fiber 10 is preferable because the optical fiber 10 can improve the dispersion compensation rate to 50% or larger when the optical fiber 10 is used for compensating the wavelength dispersion and the dispersion slope of the sea-bottom-use optical-fiber transmission line.

Figures 2, 3, 4:
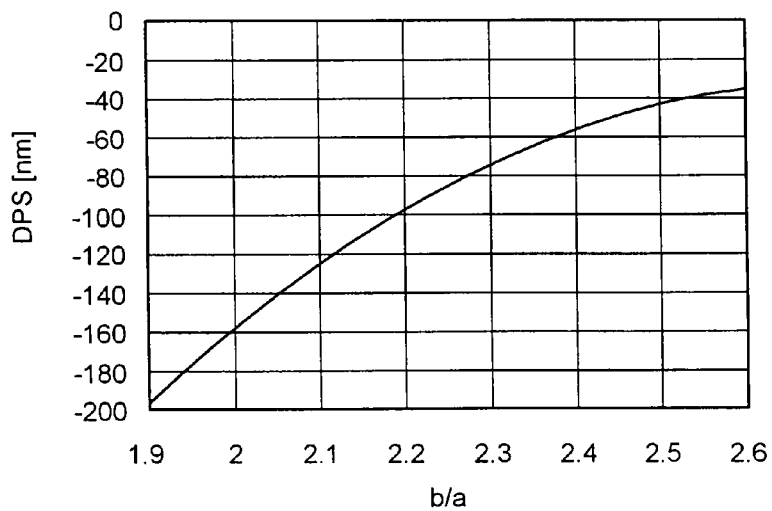
FIG. 2 is a table of an example of design parameters of the optical fiber according to the first embodiment.
FIG. 3 is a table of optical characteristics of the optical fiber calculated by a numerical simulation using the design parameters shown in FIG. 2.
FIG. 4 is a graph of a relationship between b/a and DPS.

FIG. 2 is a table of an example of the design parameters of the optical fiber 10. FIG. 3 is a table of the optical characteristics of the optical fiber 10 calculated by a numerical simulation using the design parameters shown in FIG. 2. In FIG. 3, "MFD" represents the mode field diameter, and "β/k" represents the effective refractive index obtained by dividing the propagation constant β by a wave number k. The values other than the theoretical cutoff in FIG. 3 are all values obtained at the wavelength of 1550 nanometers. When β/k is about 1.4465, the bending loss is about 10 dB/m.

Figure 5:
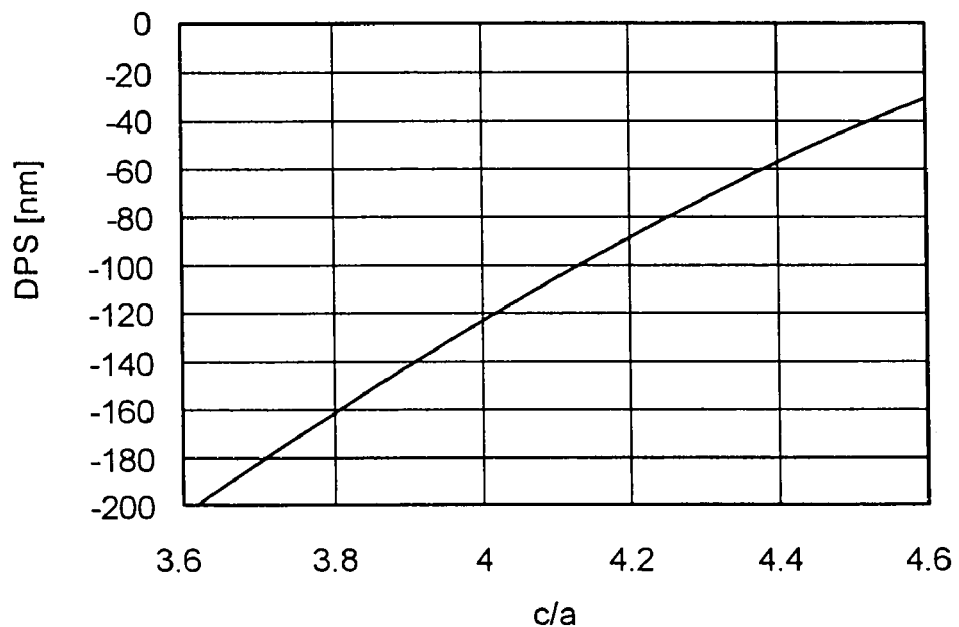
FIG. 5 is a graph of a relationship between c/a and DPS.

Description will further be given in detail for the design parameters of the optical fiber 10 referring to the calculation results of the numerical simulation. For optical characteristics, the relationship between the design parameters and the DPS or the effective core area was checked when the wavelength dispersion was maintained at 8 ps/nm/km or larger and β/k was maintained at 1.4465 in the LP01 mode that is the fundamental propagation mode. Assuming that all of the center core region 1, the inner core layer 2, and the outer core layer 3 each have a step-type refractive index profile, Δ2 is fixed at −0.3%, and Δ3 is fixed at 0.2%, the relationship between Δ1, b/a, c/a, or 2a and the dispersion slope or the effective core area was calculated. As a result, it was verified, as shown in FIGS. 4 and 5, a correlation was present respectively between b/a and c/a, and the DPS and the DPS could be set at a negative value of −100 nanometers or larger when b/a was set at 2.2 or larger and c/a was set at 4.15 or larger.

Figure 6:
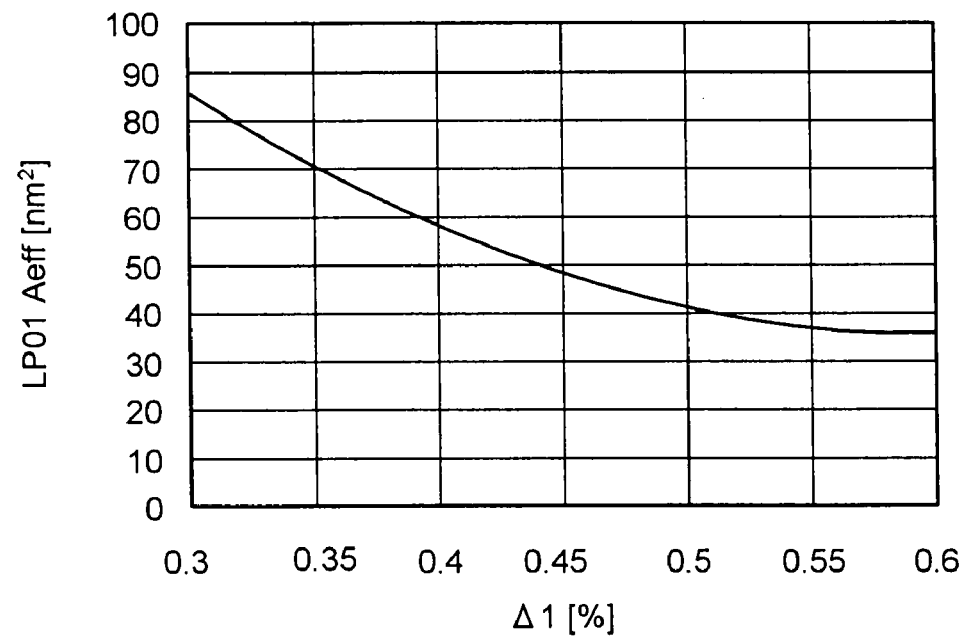
FIG. 6 is a graph of a relationship between Δ1 and effective core area.
Figure 7:
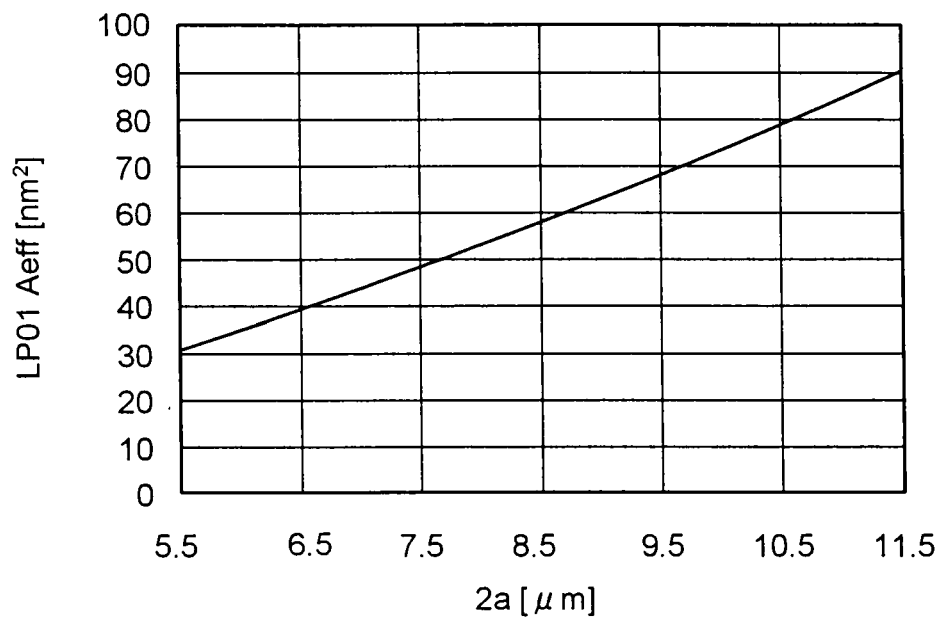
FIG. 7 is a graph of a relationship between 2a and effective core area.

It was also verified that, as shown in FIGS. 6 and 7, a correlation was present respectively between Δ1 and 2a, and the effective core area and the effective core area could be set at 40 micrometers or larger when Δ1 was set at 0.52% or smaller and 2a was set at 6.5 micrometers or larger.

Similarly, assuming that the center core region 1 has the α-type refractive index profile and both of the inner core layer 2 and the outer core layer 3 each have the step-type refractive index profile, the cases where α1 was varied from two to the infinity with which the profile is the step type, where Δ2 was varied from −0.7% to 0%, and where Δ3 was varied from 0.2% to 0.4% were also calculated. As a result, it was verified that the wavelength dispersion exceeded 0 ps/nm/km, β/k was 1.4465, the DPS was a negative value of −100 nanometers or larger, and the effective core area was 40 μm² or larger when Δ1 was 0.75% or larger, Δ2 was −0.7% to 0%, Δ3 was 0.2% to 0.3%, b/a was 1.5 or larger, c/a was 2.8 or larger, and 2a was 6.4 micrometers or larger. It was further verified that the wavelength dispersion was 8 ps/nm/km or larger when Δ1 was 0.6% or smaller.

Description will be given for the propagation modes in the optical fiber 10 according to the first embodiment. FIGS. 8 to 13 are figures of propagation mode field distributions at the wavelength of 1550 nanometers of the optical fiber 10. FIGS. 8 to 13 are diagrams respectively of the LP01 mode, the LP02 mode, the LP11 mode, the LP21 mode, the LP31 mode, and the LP41 mode. In each of FIGS. 8 to 13, the axis of abscissa represents the distance from the center of the center core region and the axis of abscissa represents the electric field intensity of the field in arbitrary units. Colored portions in FIGS. 8 to 13 each represent a region of presence of the field distribution of a standard single-mode optical fiber of which the zero-dispersion wavelength is about 1310 nanometers.

Figure 8:
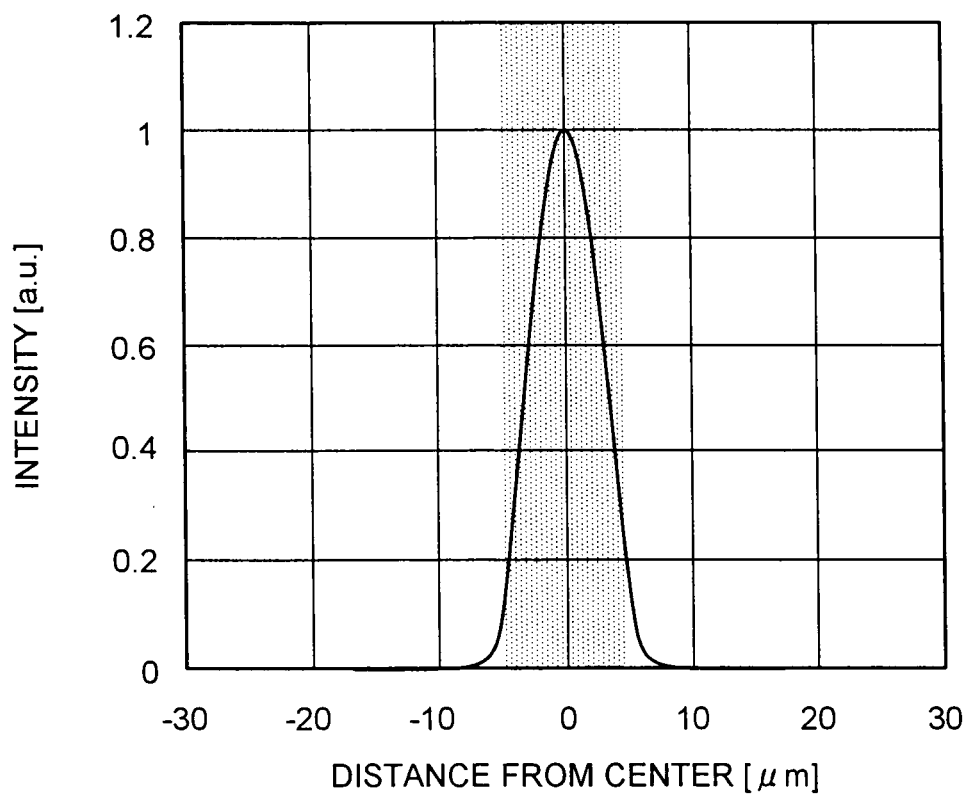
FIG. 8 is a graph of a field distribution of an LP01 mode of the optical fiber at the wavelength of 1550 nanometers according to the first embodiment.
Figure 9:
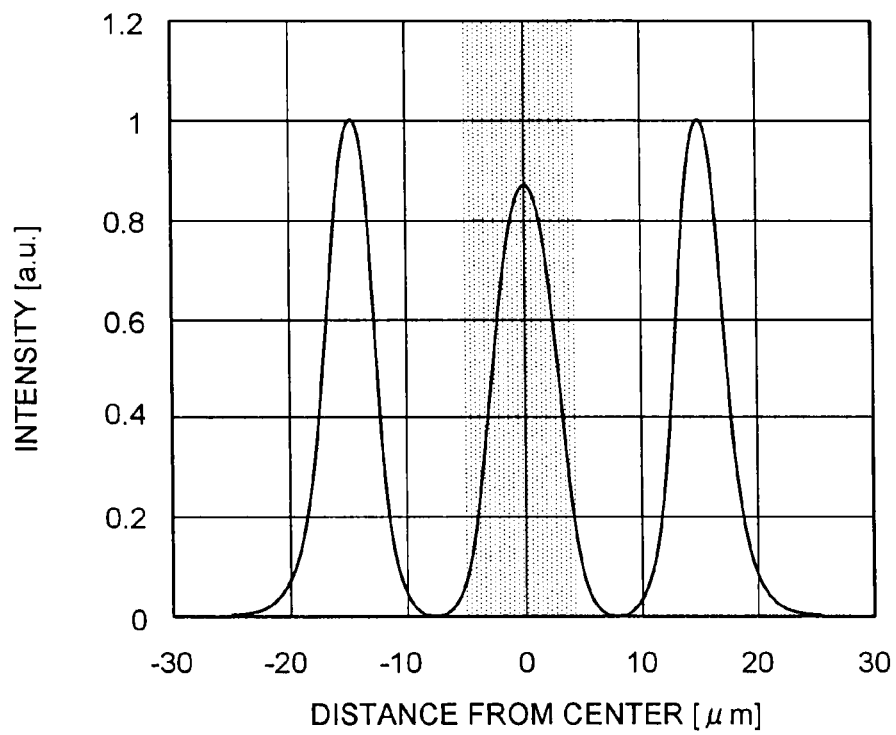
FIG. 9 is a graph of a field distribution of an LP02 mode of the optical fiber at the wavelength of 1550 nanometers according to the first embodiment.
Figure 10:
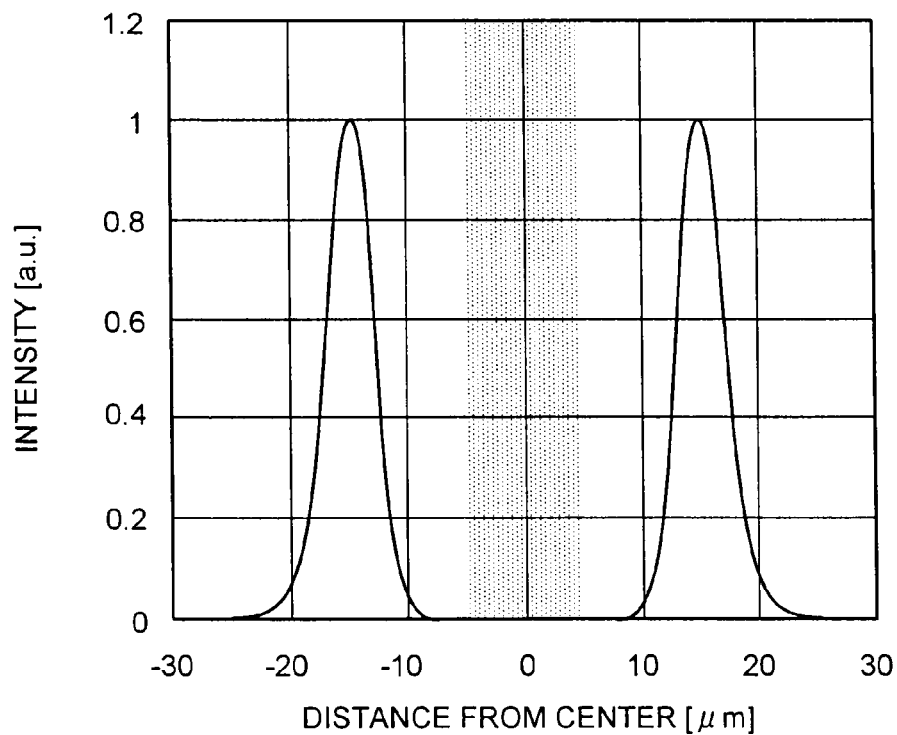
FIG. 10 is a graph of a field distribution of an LP11 mode of the optical fiber at the wavelength of 1550 nanometers according to the first embodiment.
Figure 11:
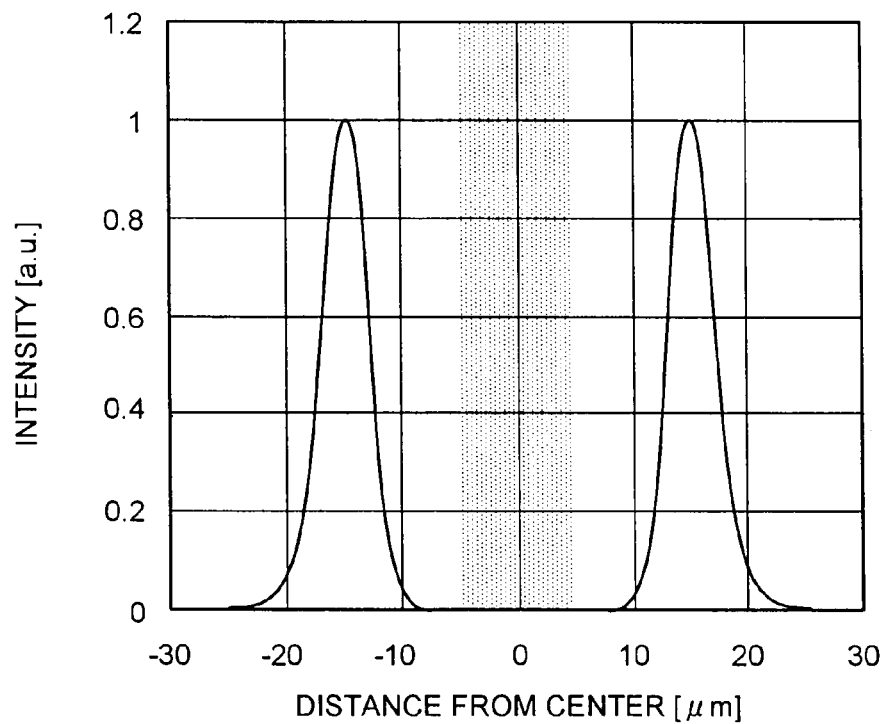
FIG. 11 is a graph of a field distribution of an LP21 mode of the optical fiber at the wavelength of 1550 nanometers according to the first embodiment.
Figure 12:
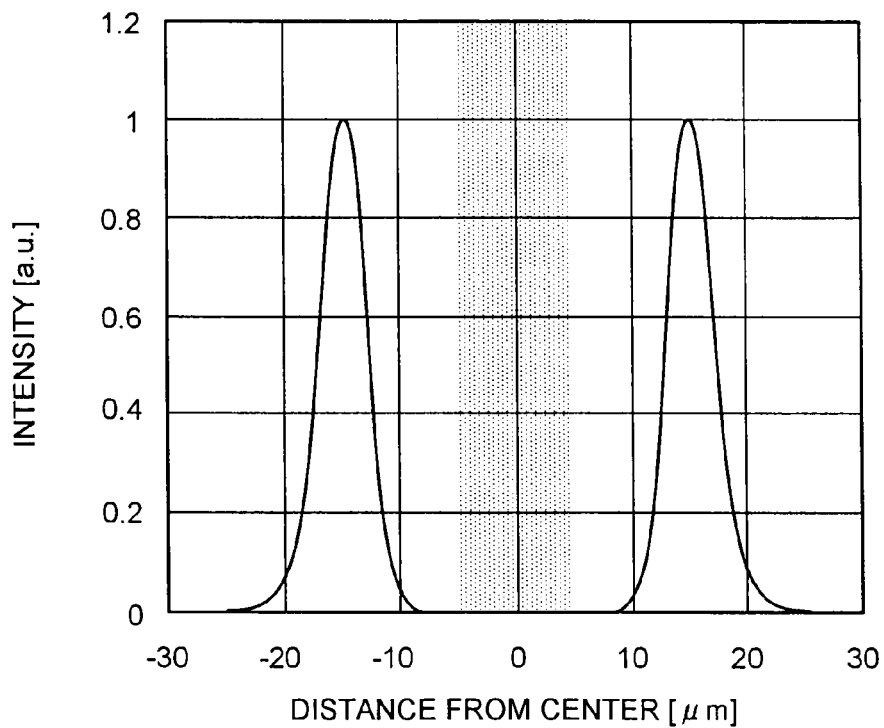
FIG. 12 is a graph of a field distribution of an LP31 mode of the optical fiber at the wavelength of 1550 nanometers according to the first embodiment.

As shown in FIG. 8, in the LP01 mode, the field distributes having a peak at around the center of the center core region. As shown in FIG. 9, in the LP02 mode, the field distributes having peaks at around the center of the center core region and a position externally to the center core region. As shown in FIGS. 10 to 13, in each of the LP11 mode to the PL41 mode, the field distributes having a peak at a position externally to the center core region.

The case where a standard single-mode optical fiber is connected to the optical fiber 10 and a signal light at the wavelength of 1550 nanometers is input into the optical fiber 10 therethrough is considered. In this case, the field distribution of the standard single-mode optical fiber is present in the colored portion. However, as shown in FIG. 8, the colored portion and the LP01-mode field distribution overlap each other at around the center. As a result, when a signal light at the wavelength of 1550 nanometers is input into the optical fiber 10 through the standard single-mode optical fiber, the LP01 mode is sufficiently excited. On the other hand, in FIGS. 10 to 13, the colored portions and the field distributions respectively of the LP11 mode to the LP41 mode almost do not overlap each other. As a result, the LP11 mode to the LP41 mode are considered almost not to be excited. On the other hand, in FIG. 10, the LP02 mode may be excited because the colored portion and the LP02-mode field distribution overlap each other at around the center.

The coupling efficiency to each propagation mode of the signal light for the case where a standard single-mode optical fiber was connected to the optical fiber 10 and a signal light at the wavelength of 1550 nanometers was input into the optical fiber 10 therethrough was calculated using the numerical simulation.

Figures 13, 14:
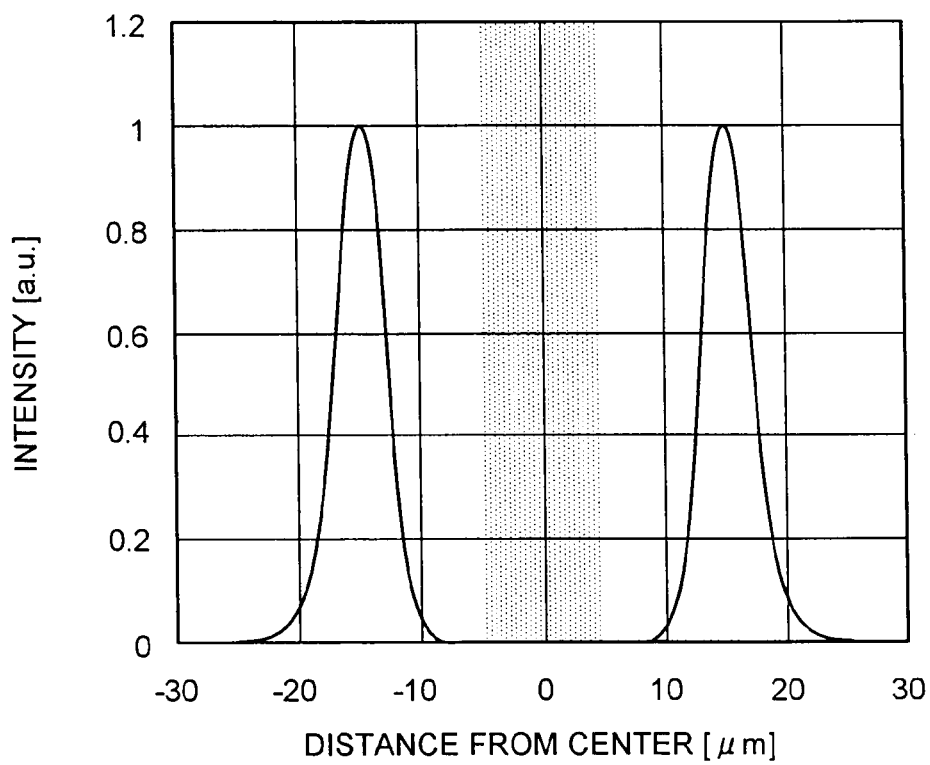
FIG. 13 is a graph of a field distribution of an LP41 mode of the optical fiber at the wavelength of 1550 nanometers according to the first embodiment.
FIG. 14 is a table of a relationship between a propagation mode and a coupling efficiency of a signal light to the propagation mode.

FIG. 14 is a table of the relationship between the propagation modes and the coupling efficiency of the signal light to each of the propagation mode. As shown in FIG. 14, the coupling efficiency to the LP01 mode was 0.09 that was large as estimated from the overlapping of the field distribution. The coupling efficiency to each of PL11 mode to the LP41 mode was a small value that was very close to zero. On the other hand, the coupling efficiency to the LP02 mode was 0.03 and was a sufficiently small value compared to the coupling efficiency to the LP01 mode. Therefore, it was verified that only the LP01 mode that was substantially the fundamental propagation mode could be selectively excited by connecting a standard single-mode optical fiber to the optical fiber 10 and inputting a signal light at the wavelength of 1550 nanometers into the optical fiber 10 therethrough.

An optical fiber to be connected to the optical fiber 10 is not limited to a standard single-mode optical fiber having the zero-dispersion wavelength thereof at around the wavelength of 1310 nanometers as above. When another single-mode optical fiber is connected, only the LP01 mode of the optical fiber 10 can be selectively excited.

As above, the LP02 mode has the field distribution that has the peaks at around the center of the center core region and a position external to the center core region. Therefore, it can be considered that, in the case where the ratio of the external peak intensity to the peak intensity at the center of the LP02 mode is increased by adjusting the design parameters of the optical fiber 10, the percentage of excited LP02 mode obtained when a signal light is input through a single-mode optical fiber is suppressed and the LP01 mode can be excited with a higher efficiency.

Description will be given for the optical characteristics obtained when optical fibers according to the first embodiment were actually manufactured as a first to a sixth examples of the present invention. FIG. 15 is a table of the design parameters of optical fibers according to the first to the sixth examples. FIG. 16 is a chart of the optical characteristics of the optical fibers according to the first to the sixth examples. The optical characteristics shown in FIG. 16 are those in the fundamental propagation mode measured at the wavelength of 1550 nanometers. "λc" represents the cutoff wavelength. The cutoff wavelength is at the longer side of the signal light wavelength. Therefore, it is difficult to measure the cutoff wavelength for a conventional optical communication measuring apparatus, so that an estimated value estimated from the design parameters is shown.

As shown in FIG. 16, each of the optical fibers according to the first to the sixth examples has the cutoff wavelength of 1550 nanometers or larger, the wavelength dispersion in the fundamental propagation mode at the wavelength of 1550 nanometers of 0 ps/nm/km or larger, the dispersion slope of −0.05 ps/nm²/km or smaller; the DPS of a negative value of −100 nanometers or larger, and the bending loss of 20 dB/m or smaller.

Figure 17:
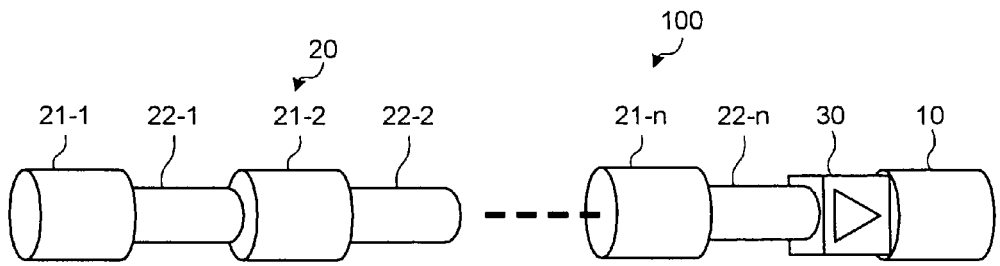
FIG. 17 is a schematic diagram showing an optical-fiber transmission line according to a second embodiment of the present invention.

Description will be given for an optical-fiber transmission line according to a second example of the present invention. FIG. 17 is a schematic diagram showing an optical-fiber transmission line 100 according to the second embodiment. The optical-fiber transmission line 100 includes a composite nonzero dispersion-shifted optical fiber 20 formed by alternately connecting large-Aeff-type nonzero dispersion-shifted optical fibers 21-1 to 21-n and low-slope-type nonzero dispersion-shifted optical fibers 22-1 to 22-n, where an integer of one or larger is represented by "n", the optical fiber 10 according to the first embodiment, and an optical amplifier 30 inserted between the composite nonzero dispersion-shifted optical fiber 20 and the optical fiber 10, and transmits a WDM signal light in the C-band from the composite nonzero dispersion-shifted optical fiber 20.

The nonzero dispersion-shifted optical fibers 21-1 to 21-n has, at the wavelength of 1550 nanometers, the wavelength dispersion of −3 ps/nm/km, the dispersion slope of 0.10 ps/nm²/km, the effective core area of 75 µm², and the transmission loss of 0.215 dB/km. On the other hand, the optical fibers 22-1 to 22-n have, at the wavelength of 1550 nanometers, the wavelength dispersion of −3 ps/nm/km, the dispersion slope of 0.05 ps/nm²/km, the effective core area of 50 µm², and the transmission loss of 0.215 dB/km. The nonzero dispersion-shifted optical fibers 21-1 to 21-n and 22-1 to 22-n each have the same length. Therefore, the composite nonzero dispersion-shifted optical fiber 20 has, at the wavelength of 1550 nanometers and as the average values for the entire length thereof, the wavelength dispersion of −3 ps/nm/km, the dispersion slope of 0.07 ps/nm²/km, the effective core area of 63 µm², and the transmission loss of 0.215 dB/km.

The optical amplifier 30 is, for example, an erbium-doped optical fiber amplifier (EDFA), amplifies the WDM signal light transmitted through the composite nonzero dispersion-shifted optical fiber 20, and compensates in advance the attenuation of the power of the WDM signal light caused by the transmission loss of the optical fiber 10. In this case, the optical amplifier 30 includes a standard single-mode optical fiber in an input/output unit for the signal light. As a result, only the fundamental propagation mode is selectively excited in the optical fiber 10 and the optical fiber 10 transmits the WDM optical signal in the fundamental propagation mode and, therefore, single-mode optical transmission is realized.

A single-mode optical fiber may be connected in advance to an optical input of an optical-fiber transmission line according to the second embodiment by fusion splicing. When the single-mode optical fiber is connected to the optical input of the optical-fiber transmission line, the coupling efficiency ratio of the LP02 mode can be further lowered by precisely aligning each center axis. Therefore, the fundamental propagation mode can be selectively excited more securely in the optical-fiber transmission line.

The optical fiber 10 has the wavelength dispersion of the fundamental propagation mode at the wavelength of 1550 nanometers of 0 ps/nm/km or larger and the dispersion slope of −0.05 ps/nm²/km or smaller. Therefore, the optical fiber 10 can simultaneously compensate the wavelength dispersion and the dispersion slope of the composite nonzero dispersion-shifted optical fiber 20. As a result, the deviation of the accumulated wavelength dispersion between optical signals of the optical-fiber transmission line 100 is significantly suppressed and the optical-fiber transmission line 100 is suitable for the WDM transmission in a wider band.

When an optical fiber transmission line that was 1,500 km long in total was constructed by connecting three 500-km-long optical-fiber transmission lines, the relationship between the transmission distance and the accumulated wavelength dispersion was compared between the case where the optical-fiber transmission line 100 according to the second embodiment was used and the conventional case where a conventional cutoff shift optical fiber was used instead of the optical fiber 10 of the optical-fiber transmission line 100.

An optical fiber having, at the wavelength of 1550 nanometers, the wavelength dispersion of 17 ps/nm/km, the dispersion slope of 0.06 ps/nm²/km, the effective core area of 80 µm², and the transmission loss of 0.185 dB/km was used as the conventional cutoff shift optical fiber, and an optical fiber having, at the wavelength of 1550 nanometers, the wavelength dispersion of 9.1 ps/nm/km, the dispersion slope of −0.172 ps/nm²/km, and the effective core area of 79.5 µm² shown in FIG. 3 was used as the optical fiber 10.

Figure 18:
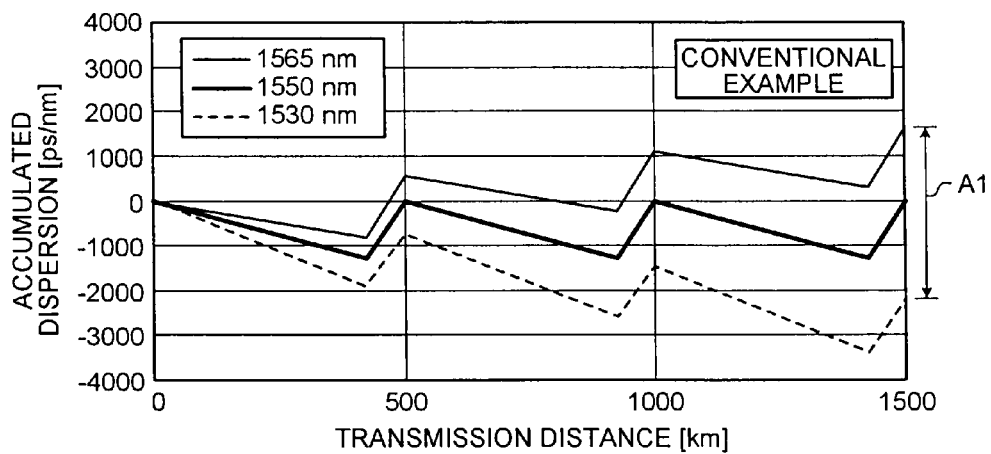
FIG. 18 is a graph of dispersion map of a conventional optical-fiber transmission line.

FIG. 18 is a graph of dispersion map showing the relationship between the transmission distance and the accumulated wavelength dispersion in a conventional optical-fiber transmission line. To set the accumulated wavelength dispersion at the wavelength of 1550 nanometers to be zero, this conventional optical-fiber transmission line is formed by alternately connecting the 425-km-long composite nonzero dispersion-shifted optical fiber 20 and the 75-km-long cutoff shift optical fiber. As a result, as shown in FIG. 18, the accumulated wavelength dispersion at the wavelength of 1550 nanometers is zero. However, the accumulated wavelength dispersion at a wavelength of 1530 nanometers is about −2182.5 ps/nm and the accumulated wavelength dispersion at a wavelength of 1565 nanometers is about 1636.9 ps/nm. That is, the deviation A1 of the accumulated wavelength dispersion at both ends of the C-band is 3819.4 ps/nm, which is considerably large.

Figure 19:
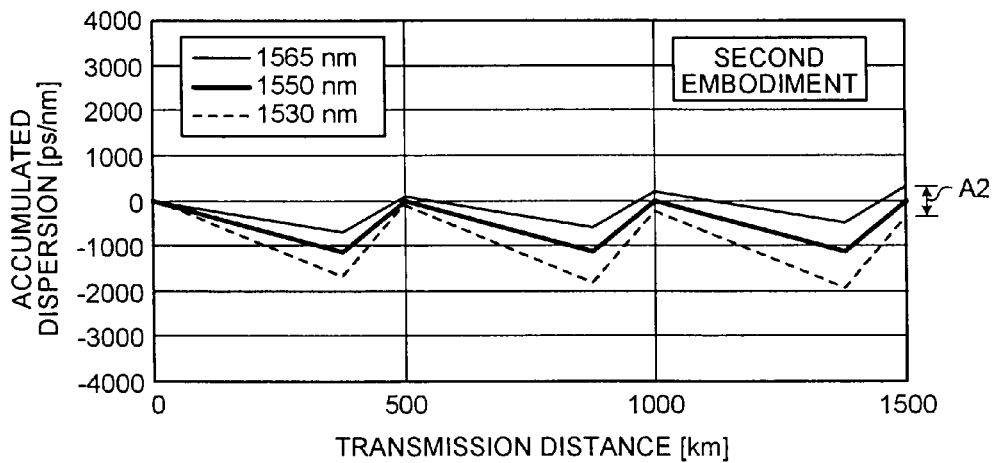
FIG. 19 is a graph of dispersion map of the optical-fiber transmission line according to the second embodiment.

On the other hand, FIG. 19 is a graph of dispersion map showing the relationship between the transmission distance and the accumulated wavelength dispersion in the optical-fiber transmission line 100 according to the second embodiment. To set the accumulated wavelength dispersion at the wavelength of 1550 nanometers to be zero, the optical-fiber transmission line 100 is formed by alternately connecting the 376-km-long composite nonzero dispersion-shifted optical fiber 20 and the 124-km-long optical fiber 10. As a result, as shown in FIG. 19, the accumulated wavelength dispersion at the wavelength of 1550 nanometers is about zero, the accumulated wavelength dispersion at the wavelength of 1530 nanometers is about −412.8 ps/nm, and the accumulated wavelength dispersion at the wavelength of 1565 nanometers is about 309.6 ps/nm. That is, the deviation of the accumulated wavelength dispersion at both ends of the C-band is 722.4 ps/nm and this is a value that is significantly reduced from that of the conventional case.

In the second embodiment, the branch length of the optical fiber 10 is 124 km and, therefore, assuming that the transmission loss thereof is 0.237 dB/km that is equal to that of the first embodiment of FIG. 16, the transmission loss for the full length thereof is 29.4 dB. On the other hand, in the conventional case, the branch length of the cutoff shift optical fiber is 75 km and, therefore, the transmission loss for the full length thereof is 13.9 dB. Therefore, the transmission loss of the optical fiber 10 for the full length thereof is larger. However, when the transmission loss of about 29.4 dB, the attenuation of the power of the signal light can be sufficiently compensated using a convention optical amplifier as the optical amplifier 30.

As described above, the optical fiber 10 has the wavelength dispersion that is smaller than that of the cutoff shift optical fiber and, therefore, the branch length necessary for compensating the dispersion becomes longer and the transmission loss for the full length thereof becomes larger. Therefore, when the wavelength dispersion in the fundamental propagation mode of the optical fiber 10 is 8 ps/nm/km or larger, the necessary branch length may be about two times as long as that of the case where the cutoff shift optical fiber is used and, therefore, this is preferable. In this case, the transmission loss for the full length of the optical fiber 10 can be lowered to, for example, about 30 dB or smaller and, therefore, the attenuation of the power of the signal light in the optical fiber 10 can sufficiently be compensated.

When the wavelength dispersion in the fundamental propagation mode of the optical fiber 10 is 8 ps/nm/km or smaller and the transmission loss for the full length becomes larger, the attenuation of the power of the signal light in the optical fiber 10 can be compensated by, for example, using an optical amplifier having a higher gain, or by dividing the optical fiber 10 into a plurality of optical fibers and connecting an optical amplifier to each of the divided optical fibers.

According to an aspect of the present invention, the optical fiber according to the present invention has a cutoff wavelength of the wavelength of a signal light or longer, has the wavelength dispersion in the fundamental propagation mode at the wavelength of a signal light of 0 ps/nm/km or larger, and has a dispersion slope of −0.05 ps/nm$^2$/km or smaller. Therefore, the optical fiber exerts an effect that the optical fiber can realize an optical fiber that can simultaneously compensate the wavelength dispersion and the dispersion slope of an optical fiber that has a negative wavelength dispersion and a positive dispersion slope.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber that transmits at least a signal light including a wavelength of 1550 nanometers in a fundamental propagation mode, the optical fiber having
   a cutoff wavelength equal to or longer than a wavelength of 1550 nanometers,
   a wavelength dispersion in the fundamental propagation mode at the wavelength of 1550 nanometers larger than 0 ps/nm/km, and
   a dispersion slope in the fundamental propagation mode at the wavelength of 1550 nanometers equal to or smaller than −0.05 ps/nm$^2$/km.

2. The optical fiber according to claim 1, wherein a bending loss of the optical fiber in the fundamental propagation mode at the wavelength of 1550 nanometers when the optical fiber is wound for 16 turns at a diameter of 20 millimeters is equal to or smaller than 20 dB/m.

3. The optical fiber according to claim 2, comprising:
   a center core region having a first refractive index;
   an inner core layer formed on an outer circumference of the center core region, the inner core layer having a second refractive index lower than the first refractive index;
   an outer core layer formed on an outer circumference of the inner core layer, the outer core layer having a third refractive index lower than the first refractive index and higher than the second refractive index; and
   a cladding layer formed on an outer circumference of the outer core layer, the cladding layer having a fourth refractive index higher than the second refractive index and lower than the third refractive index, wherein
   a relative refractive index difference of the center core region to the cladding layer is equal to or smaller than 0.75%,
   a relative refractive index difference of the inner core layer to the cladding layer is in a range between −0.7% and 0%,
   a relative refractive index difference of the outer core layer to the cladding layer is in a range between 0.2% and 0.3%,
   a ratio of an outer diameter of the inner core layer to a diameter of the center core region is equal to or larger than 1.5,
   a ratio of an outer diameter of the outer core layer to the diameter of the center core region is equal to or larger than 2.8, and
   the diameter of the center core region is equal to or larger than 6.4 micrometers.

4. The optical fiber according to claim 2, wherein
the wavelength dispersion of the optical fiber in the fundamental propagation mode at the wavelength of 1550 nanometers is equal to or larger than 8 ps/nm/km,
a dispersion per slope of the optical fiber is a negative value equal to or larger than −100 nanometers, and
an effective core area of the optical fiber is equal to or larger than 40 μm².

5. The optical fiber according to claim 4, comprising:
a center core region having a first refractive index;
an inner core layer formed on an outer circumference of the center core region, the inner core layer having a second refractive index lower than the first refractive index;
an outer core layer formed on an outer circumference of the inner core layer, the outer core layer having a third refractive index lower than the first refractive index and higher than the second refractive index; and
a cladding layer formed on an outer circumference of the outer core layer, the cladding layer having a fourth refractive index higher than the second refractive index and lower than the third refractive index, wherein
a relative refractive index difference of the center core region to the cladding layer is equal to or smaller than 0.75%,
a relative refractive index difference of the inner core layer to the cladding layer is in a range between −0.7% and 0%,
a relative refractive index difference of the outer core layer to the cladding layer is in a range between 0.2% and 0.3%,
a ratio of an outer diameter of the inner core layer to a diameter of the center core region is equal to or larger than 1.5,
a ratio of an outer diameter of the outer core layer to the diameter of the center core region is equal to or larger than 2.8, and
the diameter of the center core region is equal to or larger than 6.4 micrometers.

6. The optical fiber according to claim 1, wherein
the wavelength dispersion of the optical fiber in the fundamental propagation mode at the wavelength of 1550 nanometers is equal to or larger than 8 ps/nm/km,
a dispersion per slope of the optical fiber is a negative value equal to or larger than −100 nanometers, and
an effective core area of the optical fiber is equal to or larger than 40 μm².

7. The optical fiber according to claim 3, comprising:
a center core region having a first refractive index;
an inner core layer formed on an outer circumference of the center core region, the inner core layer having a second refractive index lower than the first refractive index;
an outer core layer formed on an outer circumference of the inner core layer, the outer core layer having a third refractive index lower than the first refractive index and higher than the second refractive index; and
a cladding layer formed on an outer circumference of the outer core layer, the cladding layer having a fourth refractive index higher than the second refractive index and lower than the third refractive index, wherein
a relative refractive index difference of the center core region to the cladding layer is equal to or smaller than 0.75%,
a relative refractive index difference of the inner core layer to the cladding layer is in a range between −0.7% and 0%,
a relative refractive index difference of the outer core layer to the cladding layer is in a range between 0.2% and 0.3%,
a ratio of an outer diameter of the inner core layer to a diameter of the center core region is equal to or larger than 1.5,
a ratio of an outer diameter of the outer core layer to the diameter of the center core region is equal to or larger than 2.8, and
the diameter of the center core region is equal to or larger than 6.4 micrometers.

8. The optical fiber according to claim 1, comprising:
a center core region having a first refractive index;
an inner core layer formed on an outer circumference of the center core region, the inner core layer having a second refractive index lower than the first refractive index;
an outer core layer formed on an outer circumference of the inner core layer, the outer core layer having a third refractive index lower than the first refractive index and higher than the second refractive index; and
a cladding layer formed on an outer circumference of the outer core layer, the cladding layer having a fourth refractive index higher than the second refractive index and lower than the third refractive index, wherein
a relative refractive index difference of the center core region to the cladding layer is equal to or smaller than 0.75%,
a relative refractive index difference of the inner core layer to the cladding layer is in a range between −0.7% and 0%,
a relative refractive index difference of the outer core layer to the cladding layer is in a range between 0.2% and 0.3%,
a ratio of an outer diameter of the inner core layer to a diameter of the center core region is equal to or larger than 1.5,
a ratio of an outer diameter of the outer core layer to the diameter of the center core region is equal to or larger than 2.8, and
the diameter of the center core region is equal to or larger than 6.4 micrometers.

9. An optical-fiber transmission line comprising:
an optical fiber that transmits at least a signal light including a wavelength of 1550 nanometers in a fundamental propagation mode, the optical fiber having a cutoff wavelength equal to or longer than a wavelength of 1550 nanometers, a wavelength dispersion larger than 0 ps/nm/km in the fundamental propagation mode at the wavelength of 1550 nanometers, and a dispersion slope in the fundamental propagation mode at the wavelength of 1550 nanometers equal to or smaller than −0.05 ps/nm²/km; and
a single-mode optical fiber configured to be connected to the optical fiber, the single-mode optical fiber having a cutoff wavelength shorter than the wavelength of 1550 nanometers, a wavelength dispersion smaller than 0 ps/nm/km at the wavelength of 1550 nanometers, and a dispersion slope larger than 0 ps/nm²/km at the wavelength of 1550 nanometers, wherein
the signal light is transmitted from the single-mode optical fiber.

10. The optical-fiber transmission line according to claim 9, wherein a bending loss of the optical fiber in the fundamental propagation mode at the wavelength of 1550 nanometers when the optical fiber is wound for 16 turns at a diameter of 20 millimeters is equal to or smaller than 20 dB/m.

11. The optical-fiber transmission line according to claim 10, comprising:
- a center core region having a first refractive index;
- an inner core layer formed on an outer circumference of the center core region, the inner core layer having a second refractive index lower than the first refractive index;
- an outer core layer formed on an outer circumference of the inner core layer, the outer core layer having a third refractive index lower than the first refractive index and higher than the second refractive index; and
- a cladding layer formed on an outer circumference of the outer core layer, the cladding layer having a fourth refractive index higher than the second refractive index and lower than the third refractive index, wherein
- a relative refractive index difference of the center core region to the cladding layer is equal to or smaller than 0.75%,
- a relative refractive index difference of the inner core layer to the cladding layer is in a range between −0.7% and 0%,
- a relative refractive index difference of the outer core layer to the cladding layer is in a range between 0.2% and 0.3%,
- a ratio of an outer diameter of the inner core layer to a diameter of the center core region is equal to or larger than 1.5,
- a ratio of an outer diameter of the outer core layer to the diameter of the center core region is equal to or larger than 2.8, and
- the diameter of the center core region is equal to or larger than 6.4 micrometers.

12. The optical-fiber transmission line according to claim 10, wherein
- the wavelength dispersion of the optical fiber in the fundamental propagation mode at the wavelength of 1550 nanometers is equal to or larger than 8 ps/nm/km,
- a dispersion per slope of the optical fiber is a negative value equal to or larger than −100 nanometers, and
- an effective core area of the optical fiber is equal to or larger than 40 μm².

13. The optical-fiber transmission line according to claim 12, comprising:
- a center core region having a first refractive index;
- an inner core layer formed on an outer circumference of the center core region, the inner core layer having a second refractive index lower than the first refractive index;
- an outer core layer formed on an outer circumference of the inner core layer, the outer core layer having a third refractive index lower than the first refractive index and higher than the second refractive index; and
- a cladding layer formed on an outer circumference of the outer core layer, the cladding layer having a fourth refractive index higher than the second refractive index and lower than the third refractive index, wherein
- a relative refractive index difference of the center core region to the cladding layer is equal to or smaller than 0.75%,
- a relative refractive index difference of the inner core layer to the cladding layer is in a range between −0.7% and 0%,
- a relative refractive index difference of the outer core layer to the cladding layer is in a range between 0.2% and 0.3%,
- a ratio of an outer diameter of the inner core layer to a diameter of the center core region is equal to or larger than 1.5,
- a ratio of an outer diameter of the outer core layer to the diameter of the center core region is equal to or larger than 2.8, and
- the diameter of the center core region is equal to or larger than 6.4 micrometers.

14. The optical-fiber transmission line according to claim 9, comprising:
- a center core region having a first refractive index;
- an inner core layer formed on an outer circumference of the center core region, the inner core layer having a second refractive index lower than the first refractive index;
- an outer core layer formed on an outer circumference of the inner core layer, the outer core layer having a third refractive index lower than the first refractive index and higher than the second refractive index; and
- a cladding layer formed on an outer circumference of the outer core layer, the cladding layer having a fourth refractive index higher than the second refractive index and lower than the third refractive index, wherein
- a relative refractive index difference of the center core region to the cladding layer is equal to or smaller than 0.75%,
- a relative refractive index difference of the inner core layer to the cladding layer is in a range between −0.7% and 0%,
- a relative refractive index difference of the outer core layer to the cladding layer is in a range between 0.2% and 0.3%,
- a ratio of an outer diameter of the inner core layer to a diameter of the center core region is equal to or larger than 1.5,
- a ratio of an outer diameter of the outer core layer to the diameter of the center core region is equal to or larger than 2.8, and
- the diameter of the center core region is equal to or larger than 6.4 micrometers.

15. The optical-fiber transmission line according to claim 9, wherein
- the wavelength dispersion of the optical fiber in the fundamental propagation mode at the wavelength of 1550 nanometers is equal to or larger than 8 ps/nm/km,
- a dispersion per slope of the optical fiber is a negative value equal to or larger than −100 nanometers, and
- an effective core area of the optical fiber is equal to or larger than 40 μm².

16. The optical-fiber transmission line according to claim 15, comprising:
- a center core region having a first refractive index;
- an inner core layer formed on an outer circumference of the center core region, the inner core layer having a second refractive index lower than the first refractive index;
- an outer core layer formed on an outer circumference of the inner core layer, the outer core layer having a third refractive index lower than the first refractive index and higher than the second refractive index; and
- a cladding layer formed on an outer circumference of the outer core layer, the cladding layer having a fourth refractive index higher than the second refractive index and lower than the third refractive index, wherein
- a relative refractive index difference of the center core region to the cladding layer is equal to or smaller than 0.75%,
- a relative refractive index difference of the inner core layer to the cladding layer is in a range between −0.7% and 0%, a relative refractive index difference of the outer core layer to the cladding layer is in a range between 0.2% and 0.3%, a ratio of an outer diameter of the inner core layer to a diameter of the center core region is equal to or larger than 1.5, a ratio of an outer diameter of the outer core layer to the diameter of the center core region is equal to or larger than 2.8, and the diameter of the center core region is equal to or larger than 6.4 micrometers.

17. The optical-fiber transmission line according to claim 9, wherein the single-mode optical fiber has a wavelength dispersion in a range between −1 ps/nm/km and −5 ps/nm/km at the wavelength of 1550 nanometers.

18. The optical-fiber transmission line according to claim 17, wherein the single-mode optical fiber has a dispersion per slope in a range between −50 nanometers and −20 nanometers at the wavelength of 1550 nanometers.

19. The optical-fiber transmission line according to claim 9, wherein the single-mode optical fiber has a dispersion per slope in a range between −50 nanometers and −20 nanometers at the wavelength of 1550 nanometers.

* * * * *